US012646516B2

(12) United States Patent
Hao

(10) Patent No.: US 12,646,516 B2
(45) Date of Patent: Jun. 2, 2026

(54) WAKE-UP METHOD AND APPARATUS FOR SMART DEVICE, STORAGE MEDIUM, AND ELECTRONIC DEVICE

(71) Applicants:QINGDAO HAIER TECHNOLOGY CO., LTD., Qingdao (CN); HAIER SMART HOME CO., LTD., Qingdao (CN)

(72) Inventor: Bin Hao, Qingdao (CN)

(73) Assignees: QINGDAO HAIER TECHNOLOGY CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 159 days.

(21) Appl. No.: 18/575,319

(22) PCT Filed: May 27, 2022

(86) PCT No.: PCT/CN2022/095732
§ 371 (c)(1),
(2) Date: Dec. 29, 2023

(87) PCT Pub. No.: WO2023/273747
PCT Pub. Date: Jan. 5, 2023

(65) Prior Publication Data
US 2025/0006189 A1 Jan. 2, 2025

(30) Foreign Application Priority Data
Jun. 29, 2021 (CN) .......................... 202110725401.3

(51) Int. Cl.
*G10L 15/22* (2006.01)
*G10L 21/0208* (2013.01)
*G10L 25/21* (2013.01)

(52) U.S. Cl.
CPC .......... *G10L 15/22* (2013.01); *G10L 21/0208* (2013.01); *G10L 25/21* (2013.01); (Continued)

(58) Field of Classification Search
CPC ... G10L 15/22; G10L 15/30; G10L 21/02082; G10L 2015/223; G10L 25/21; (Continued)

(56) References Cited

U.S. PATENT DOCUMENTS

| 12,322,390 | B2 * | 6/2025 | Dureau | ................... G10L 15/22 |
| 2020/0074988 | A1 * | 3/2020 | Park | ....................... G06N 3/045 |

(Continued)

FOREIGN PATENT DOCUMENTS

| CN | 109215663 A | 1/2019 |
| CN | 109391528 A | 2/2019 |

(Continued)

OTHER PUBLICATIONS

The search report of the Corresponding IN application No. 202347089841 issued on Nov. 7, 2025.

*Primary Examiner* — Vijay B Chawan
(74) *Attorney, Agent, or Firm* — The Sun IP Law

(57) ABSTRACT

A wake-up method and apparatus for a smart device, a storage medium and an electronic device are provided. The method includes: selecting, from a plurality of smart devices, at least one smart device that is allowed to be awakened by a wake-up signal as at least one candidate device; when there are multiple candidate devices, determining a target wake-up angle and target wake-up energy corresponding to each of the multiple candidate devices; and determining a target device from the multiple candidate devices according to the target wake-up angle and the target wake-up energy, wherein the target device is used for responding to the wake-up signal.

15 Claims, 4 Drawing Sheets

(52) U.S. Cl.
CPC .................. *G10L 2015/223* (2013.01); *G10L 2021/02082* (2013.01)

(58) Field of Classification Search
CPC ......... G10L 15/10; G10L 15/16; G10L 25/51; G10L 21/0208; G10L 15/07; G10L 2015/088; G06F 3/167; G06F 3/16; G06F 1/3231
USPC ........................................................ 704/233
See application file for complete search history.

(56) References Cited

U.S. PATENT DOCUMENTS

| | | | | |
|---|---|---|---|---|
| 2020/0365152 | A1* | 11/2020 | Han | G10L 15/16 |
| 2020/0395005 | A1* | 12/2020 | Zheng | G01S 3/8006 |
| 2021/0084589 | A1* | 3/2021 | Yu | H04W 52/0229 |
| 2021/0375281 | A1* | 12/2021 | Gao | G10L 15/083 |
| 2022/0199072 | A1* | 6/2022 | Wang | G06F 3/165 |
| 2025/0006189 | A1* | 1/2025 | Hao | G06F 3/16 |

FOREIGN PATENT DOCUMENTS

| | | | | | | |
|---|---|---|---|---|---|---|
| CN | 109688512 | A | * | 4/2019 | ............ | H04R 1/326 |
| CN | 110211580 | A | * | 9/2019 | ............ | G10L 15/22 |
| CN | 110211599 | A | | 9/2019 | | |
| CN | 110740083 | A | * | 1/2020 | ........ | H04L 12/2821 |
| CN | 110927668 | A | | 3/2020 | | |
| CN | 111308414 | A | | 6/2020 | | |
| CN | 112037789 | A | | 12/2020 | | |
| CN | 112420051 | A | | 2/2021 | | |
| CN | 112837686 | A | | 5/2021 | | |
| CN | 112837694 | A | | 5/2021 | | |
| CN | 113593548 | A | | 11/2021 | | |
| CN | 120223452 | A | * | 6/2025 | ............ | G10L 15/22 |
| TW | 201941643 | A | | 10/2019 | | |
| WO | WO-2022007944 | A1 | * | 1/2022 | ........ | H04W 64/006 |
| WO | WO-2023020076 | A1 | * | 2/2023 | ............ | G10L 15/30 |

* cited by examiner

Fig. 2

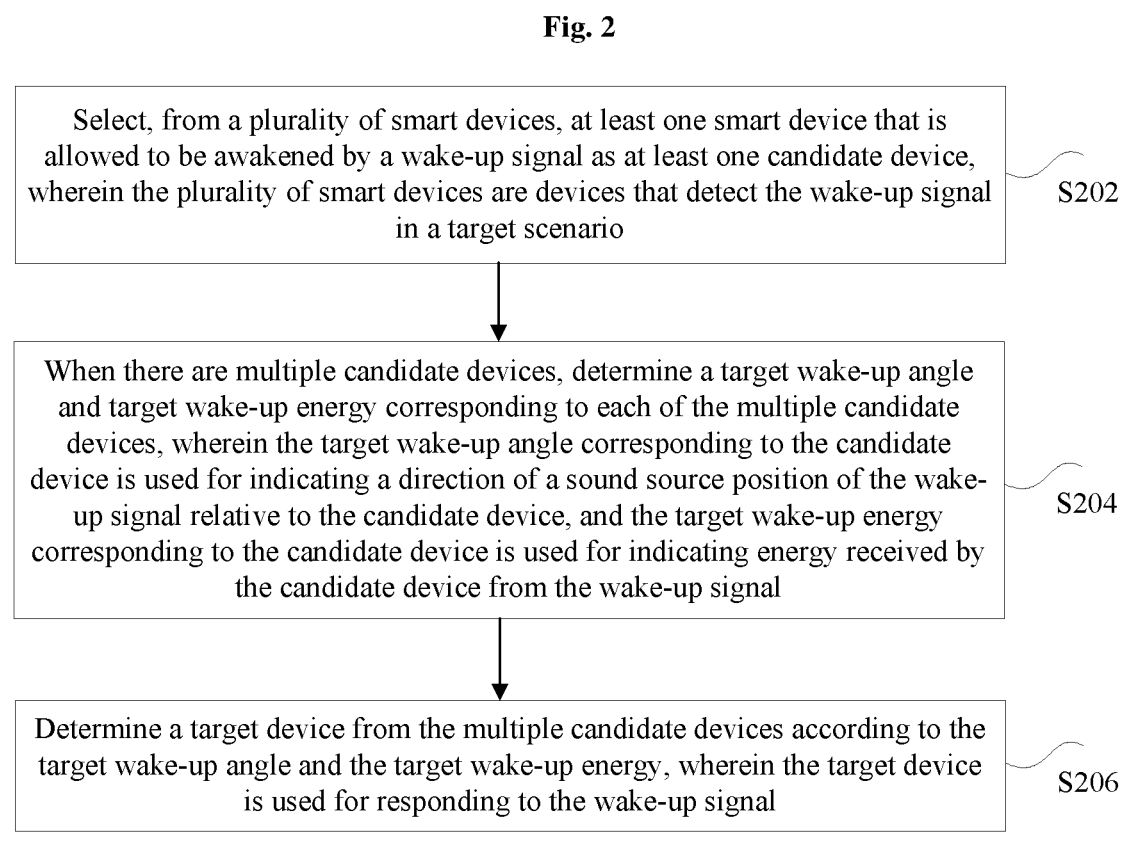

Select, from a plurality of smart devices, at least one smart device that is allowed to be awakened by a wake-up signal as at least one candidate device, wherein the plurality of smart devices are devices that detect the wake-up signal in a target scenario — S202

When there are multiple candidate devices, determine a target wake-up angle and target wake-up energy corresponding to each of the multiple candidate devices, wherein the target wake-up angle corresponding to the candidate device is used for indicating a direction of a sound source position of the wake-up signal relative to the candidate device, and the target wake-up energy corresponding to the candidate device is used for indicating energy received by the candidate device from the wake-up signal — S204

Determine a target device from the multiple candidate devices according to the target wake-up angle and the target wake-up energy, wherein the target device is used for responding to the wake-up signal — S206

WAKE-UP METHOD AND APPARATUS FOR SMART DEVICE, STORAGE MEDIUM, AND ELECTRONIC DEVICE

The present disclosure is a National Stage Filing of the PCT International Application No. PCT/CN2022/095732 filed on May 27, 2022, which claims priority to Chinese Patent Application No. 202110725401.3 filed with the China National Intellectual Property Administration on Jun. 29, 2021 and entitled "Wake-up Method and Apparatus for Smart Device, Storage Medium, and Electronic Device", which is incorporated herein by reference in its entirety.

TECHNICAL FIELD

The present disclosure relates to the field of communications, and in particular, to a wake-up method and apparatus for a smart device, a storage medium, and an electronic device.

BACKGROUND

With the advancement of computer performance, artificial intelligence is demonstrating its advantages in various fields, allowing people to gradually experience the charm of smart technology and the Internet of Things. In a smart home scenario, there may be a plurality of devices configured with voice interaction functions simultaneously, such as a television, a speaker, and an air conditioner. After a user issues a wake-up instruction, the user may only want one device to respond. The current wake-up solution considers the position of the user relative to the devices. For example, assuming that the user who issues the wake-up instruction is within a preset range of device A, even if there is another device B closer to the user and the user actually wants to wake up the device B, the device A will still take priority in responding. This results in that the device responding to the user's wake-up instruction is not the device that the user really wants to wake up.

For the problems in the related art, such as low accuracy in determining a smart device that responds to a wake-up instruction, no effective solution has been proposed.

SUMMARY

Embodiments of the present disclosure provide a wake-up method and apparatus for a smart device, a storage medium, and an electronic apparatus, which may at least solve the problems in the related art, such as low accuracy in determining a smart device that responds to a wake-up instruction.

According to one of the embodiments of the present disclosure, provided is a wake-up method for a smart device, including: selecting, from a plurality of smart devices, at least one smart device that is allowed to be awakened by a wake-up signal as at least one candidate device, wherein the plurality of smart devices are devices that detect the wake-up signal in a target scenario; when there are multiple candidate devices, determining a target wake-up angle and target wake-up energy corresponding to each of the multiple candidate devices, wherein the target wake-up angle corresponding to the candidate device is used for indicating a direction of a sound source position of the wake-up signal relative to the candidate device, and the target wake-up energy corresponding to the candidate device is used for indicating energy received by the candidate device from the wake-up signal; and determining a target device from the multiple candidate devices according to the target wake-up angle and the target wake-up energy, wherein the target device is used for responding to the wake-up signal.

In an exemplary embodiment, determining the target device from the multiple candidate devices according to the target wake-up angle and the target wake-up energy includes: determining a candidate device of which the target wake-up angle falls in an angle range as the target device; and when none of target wake-up angles corresponding to the multiple candidate devices falls in the angle range, determining a candidate device with maximum target wake-up energy as the target device.

In an exemplary embodiment, determining the target wake-up angle corresponding to each of the multiple candidate devices includes: constructing a search function for a wake-up angle variable of each of the multiple candidate devices based on the wake-up signal and the wake-up angle variable of each of the multiple candidate devices; and performing an optimization search on the search function to obtain an optimal solution for the wake-up angle variable of each of the multiple candidate devices as the target wake-up angle corresponding to each of the multiple candidate devices.

In an exemplary embodiment, constructing the search function for the wake-up angle variable of each of the multiple candidate devices based on the wake-up signal and the wake-up angle variable of each of the multiple candidate devices includes: constructing a covariance matrix of the wake-up angle variable of each of the multiple candidate devices based on the wake-up signal; constructing a directional derivative for the wake-up angle variable of each of the multiple candidate devices based on the wake-up angle variable of each of the multiple candidate devices; and constructing, based on the covariance matrix and the directional derivative, a maximum likelihood function for the wake-up angle variable of each of the multiple candidate devices as the search function.

In an exemplary embodiment, performing the optimization search on the search function to obtain the optimal solution for the wake-up angle variable of each of the multiple candidate devices as the target wake-up angle corresponding to each of the multiple candidate devices includes: initializing search parameters of an optimization search algorithm to obtain target search parameters, wherein the search parameters include: number of particles, particle positions, number of iterations, position range of each particle, maximum speed of each particle, and a learning factor; and executing the optimization search algorithm on the search function by using the target search parameters and linearly decreasing inertia weight, so as to obtain the optimal solution for the wake-up angle variable of each of the multiple candidate devices as the target wake-up angle corresponding to each of the multiple candidate devices.

In an exemplary embodiment, initializing the search parameters of the optimization search algorithm to obtain the target search parameters includes: initializing the number of particles, the number of iterations, the maximum speed of each particle and the learning factor to obtain a target number of particles, a target number of iterations, a target maximum speed and a target learning factor, wherein the target number of particles, the target number of iterations, the target maximum speed and the target learning factor are used for ensuring that accuracy of the optimization search algorithm reaches an accuracy threshold while minimizing a calculation amount of the optimization search algorithm; initializing a position range of each particle according to microphone array arrangement of each of the multiple candidate devices to obtain a target position range; and initializing the particle positions using a historical optimal solution, so as to obtain target particle positions, wherein the target search parameters include the target number of particles, the target number of iterations, the target maximum speed, the target learning factor, the target position range and the target particle positions.

In an exemplary embodiment, determining the target wake-up energy corresponding to each of the multiple candidate devices includes: calculating an energy sum within a frequency range of the wake-up signal and corresponding to each of the multiple candidate devices; and determining the energy sum as the target wake-up energy corresponding to each of the multiple candidate devices.

In an exemplary embodiment, selecting, from the plurality of smart devices, at least one smart device that is allowed to be awakened by the wake-up signal as at least one candidate device includes: executing an echo cancellation operation and/or a noise cancellation operation on a voice signal received by each smart device, so as to obtain the wake-up signal, wherein the noise cancellation operation includes at least one of: stationary noise suppression, reverberation suppression, and non-stationary noise suppression; performing wake-up discrimination on each smart device based on the wake-up signal; and determining, from the plurality of smart devices, at least one smart device of which the wake-up discrimination is successful as the at least one candidate device.

According to another aspect of the embodiments of the present disclosure, also provided is a wake-up apparatus for a smart device, including: an acquisition module, configured to select, from a plurality of smart devices, at least one smart device that is allowed to be awakened by a wake-up signal as at least one candidate device, wherein the plurality of smart devices are devices that detect the wake-up signal in a target scenario; a first determination module, configured to determine, when there are multiple candidate devices, a target wake-up angle and target wake-up energy corresponding to each of the multiple candidate devices, wherein the target wake-up angle corresponding to the candidate device is used for indicating a direction of a sound source position of the wake-up signal relative to the candidate device, and the target wake-up energy corresponding to the candidate device is used for indicating energy received by the candidate device from the wake-up signal; and a second determination module, configured to determine a target device from the multiple candidate devices according to the target wake-up angle and the target wake-up energy, wherein the target device is used for responding to the wake-up signal.

According to another aspect of the embodiments of the present disclosure, also provided is a computer-readable storage medium which stores a computer program, wherein the computer program, when running on a processor, causes the processor to execute the described wake-up method for the smart device.

According to another aspect of the embodiments of the present disclosure, also provided is an electronic device, including a memory, a processor and a computer program stored in the memory and executable on the processor, wherein the processor runs the computer program to execute the described wake-up method for the smart device.

In the embodiments of the present disclosure, at least one smart device that is allowed to be awakened by a wake-up signal is determined from a plurality of smart devices as at least one candidate device, wherein the plurality of smart devices are devices that detect the wake-up signal in a target scenario; when there are multiple candidate devices, a target wake-up angle and target wake-up energy corresponding to each of the multiple candidate devices are determined, wherein the target wake-up angle corresponding to the candidate device is used for indicating a direction of a sound source position of the wake-up signal relative to the candidate device, and the target wake-up energy corresponding to the candidate device is used for indicating energy received by each candidate device from the wake-up signal; and a target device is determined from the multiple candidate devices according to the target wake-up angle and the target wake-up energy, wherein the target device is used for responding to the wake-up signal. In the technical solution, when there are a plurality of device that detect the wake-up signal in a target scenario, at least one smart device that is allowed to be awakened by the wake-up signal is acquired as at least one candidate device, and when there are multiple candidate devices, a target wake-up angle and target wake-up energy corresponding to each of the multiple candidate devices are determined, and then a target device for responding to the wake-up signal is determined according to the target wake-up angle and the target wake-up energy. By means of the described technical solutions, the problems in the related art such as low accuracy in determining a smart device that responds to a wake-up instruction are solved, achieving the technical effect of enhancing the accuracy in determining a smart device that responds to a wake-up instruction.

BRIEF DESCRIPTION OF THE DRAWINGS

Drawings, provided for further understanding of the present disclosure and forming a part of the present disclosure, are used to explain the present disclosure together with exemplary embodiments of the present disclosure rather than to limit the present disclosure. In the drawings:

FIG. 2 is a flowchart of a wake-up method for a smart device according to an embodiment of the present disclosure;

DETAILED DESCRIPTION OF THE EMBODIMENTS

In order to make a person having ordinary skill in the art better understand the solutions of the present disclosure, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person having ordinary skill in the art based on the embodiments of the present disclosure without creative efforts shall belong to the scope of protection of the present disclosure.

It should be noted that terms "first", "second", and the like in the description, claims, and drawings of the present disclosure are used to distinguish similar objects, and are not necessarily used to describe a specific sequence or order. It should be understood that the data so used may be interchanged where appropriate so that embodiments of the present disclosure described herein may be implemented in sequences other than those illustrated or described herein. In addition, the terms "including", "having" and any variations thereof are intended to cover non-exclusive inclusion, for example, a process, method, system, product or apparatus that includes a series of operations or units is not necessarily limited to those operations or units that are clearly listed, but may include other operations or units that are not clearly listed or inherent to such process, method, product or apparatus.

Figure 1:
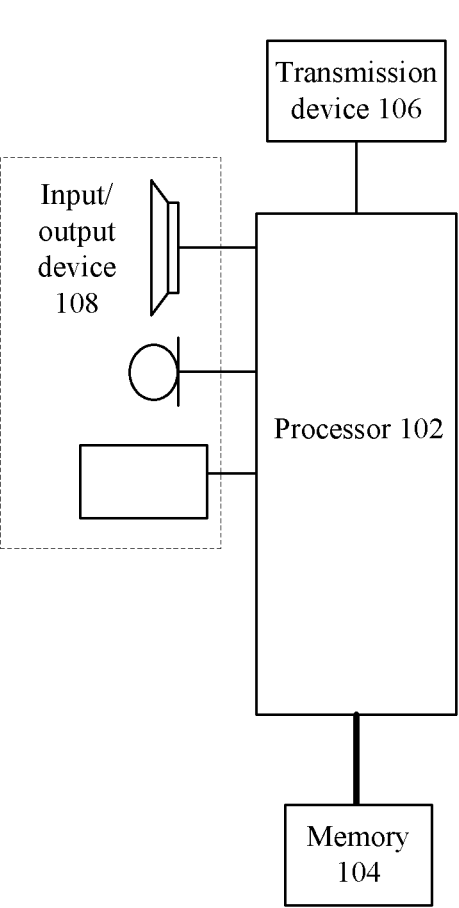
FIG. 1 is a block diagram of the hardware structure of a computer terminal for implementing a wake-up method for a smart device according to an embodiment of the present disclosure.

The method embodiments of the present disclosure may be executed in a terminal, a computer terminal or a similar computing device. By taking the running on a computer terminal as an example, FIG. 1 is a block diagram of the hardware structure of a computer terminal for implementing a wake-up method for a smart device according to an embodiment of the present disclosure. As shown in FIG. 1, the computer terminal may include one or more (only one is shown in FIG. 1) processors 102 (the processors 102 may include, but are not limited to, a processing device such as a microprocessor (e.g., Microcontroller Unit (MCU)) or a programmable logic device (e.g., Field Programmable Gate Array (FPGA)), and a memory 104 configured to store data. In an exemplary embodiment, the computer terminal may further include a transmission device 106 configured to perform communication functions and an input/output device 108. A person having ordinary skill in the art may understand that, the structure shown in FIG. 1 is merely exemplary, which does not limit the structure of the computer terminal. For example, the computer terminal may further include more or fewer components than shown in FIG. 1, or have different configurations with equivalent or additional functions compared to those shown in FIG. 1.

The memory 104 may be configured to store a computer program, for example, a software program and modules of application software, such as a computer program corresponding to the wake-up method for the smart device in the embodiments of the present disclosure. The processor 102 executes various functional applications and data processing by running the computer program stored in the memory 104, so as to realize the described method. The memory 104 may include high-speed random access memory, and may also include non-volatile memory, such as one or more magnetic storage devices, flash memory, or other non-volatile solid-state memory. In some examples, the memory 104 may further include storages that are remotely configured relative to the processor 102, and the remote storages may be connected to the computer terminal via a network. The examples of the described network include, but are not limited to, the Internet, enterprise intranets, local area networks, mobile communication networks, and combinations thereof.

The transmission device 106 is configured to receive or transmit data via a network. The specific examples of the described network may include a wireless network provided by a communication provider of the computer terminal. In an example, the transmission device 106 includes a Network Interface Controller (NIC), and may be connected to other network devices through a base station to communicate with the Internet. In an example, the transmission device 106 may be a Radio Frequency (RF) module, configured to communicate with the Internet in a wireless manner.

This embodiment provides a wake-up method for a smart device, which may be performed by the described computer terminal. FIG. 2 is a flowchart of the wake-up method for the smart device according to the embodiment of the present disclosure. The process includes the following operations S202 to S206.

At operation S202, at least one smart device that is allowed to be awakened by a wake-up signal is selected from a plurality of smart devices as at least one candidate device, wherein the plurality of smart devices are devices that detect the wake-up signal in a target scenario.

At operation S204, when there are multiple candidate devices, a target wake-up angle and target wake-up energy corresponding to each of the multiple candidate devices are determined, wherein the target wake-up angle corresponding to the candidate device is used for indicating a direction of a sound source position of the wake-up signal relative to the candidate device, and the target wake-up energy corresponding to the candidate device is used for indicating energy received by the candidate device from the wake-up signal.

At operation S206, a target device is determined from the multiple candidate devices according to the target wake-up angle and the target wake-up energy, wherein the target device is used for responding to the wake-up signal.

By means of the described operations, when there are a plurality of smart devices that detect the wake-up signal in a target scenario, at least one smart device that is allowed to be awakened by the wake-up signal is determined from the plurality of smart devices as at least one candidate device; and when there are multiple candidate devices, a target wake-up angle and target wake-up energy corresponding to each candidate device are determined, and then a target device for responding to the wake-up signal is determined according to the target wake-up angle and the target wake-up energy. By means of the described technical solutions, the problems in the related art such as low accuracy in determining a smart device that responds to a wake-up instruction are solved, achieving the technical effect of enhancing the accuracy in determining a smart device that responds to a wake-up instruction.

In the technical solution provided in operation S202, the plurality of smart devices are devices that detect a wake-up signal in a target scenario, such as a television set, a set-top box, a mobile phone, a speaker, an air conditioner, an oven, a steamer, a frying pan, and a microwave oven, and so on.

In some exemplary implementations of the embodiment, the wake-up signal may be, but is not limited to, wake-up information which is extracted from a voice signal issued by a user and is to be subjected to wake-up discrimination, for example, a wake-up signal may be obtained by performing a series of processing on the voice signal issued by the user. A wake-up instruction, such as a wake-up keyword, may be extracted from the wake-up signal. The plurality of smart devices may be, but are not limited to, devices that receive a voice signal in a target scenario and extract a wake-up keyword. The smart device that is allowed to be awakened by the wake-up signal may be, but is not limited to, a device that is allowed to be awakened by using the same wake-up keyword in the target scenario.

In some exemplary implementations of the embodiment, the target scenario may include, but is not limited to, any type of scenario that allows for smart control, such as, home, garage, office, classroom, teaching building, laboratory, and the like.

In an exemplary embodiment, at least one smart device that is allowed to be awakened by a wake-up signal may be determined from a plurality of smart devices as at least one candidate device by, but is not limited to, the following manner: performing an echo cancellation operation and/or a noise cancellation operation on a voice signal received by each smart device, so as to obtain a wake-up signal, wherein the noise cancellation operation includes at least one of: stationary noise suppression, reverberation suppression, and non-stationary noise suppression; performing wake-up discrimination on each smart device based on the wake-up signal; and determining, from the plurality of smart devices, at least one smart device of which the wake-up discrimination is successful as at least one candidate device.

In some exemplary implementations of the embodiment, for a device with a self-play function in the smart devices, an Acoustic Echo Cancellation (AEC) operation may be performed first, where the echo cancellation operation may use, but is not limited to, a Normalized Least Mean Square (NLMS, which is a type of adaptive filter) dual-filter method.

In some exemplary implementations of the embodiment, the noise cancellation operation May include, but is not limited to, at least one of: stationary noise suppression, reverberation suppression, and non-stationary noise suppression. That is, one or more noise cancellation operations may be performed on the voice signal or the voice signal on which the echo cancellation operation has been performed according to actual requirements. The noise cancellation operation may be performed in a short-time Fourier transform domain, but is not limited thereto.

In some exemplary implementations of the embodiment, an operation process of the stationary noise suppression may be, but is not limited to: first estimating a noise spectrum by using a minimum value tracking method (e.g., Improved Minimum Controlled Return Average (IMCRA)), and then obtaining a gain value $G_n(f)$ of the stationary noise suppression by using Optimally-Modified Log-Spectral Amplitude (ORLSA) estimation.

In some exemplary implementations of the embodiment, an operating process of reverberation suppression may be, but is not limited to, using signal energy ratio (e.g., Coherent-to-Diffuse Power Ratio (CDR)) estimation, that is, assuming that a noise field is a scattering noise field, calculating CDR for each group of microphone pairs, and performing weighted averaging on all groups microphone pairs to obtain CDR(f), thereby obtaining a gain value $G_r(f)$ of the reverberation suppression.

In some exemplary implementations of the embodiment, an operation process of the non-stationary noise suppression may be, but is not limited to, using a linear filter, that is, assuming that a maximum length of a wake-up word is 800 ms, performing updating by using data preceding the 800 ms to obtain filter information, and using the filter information to adaptively perform noise cancellation on the wake-up word at the current moment; and after obtaining the signal $X_w(f)$ passing through the linear filter, obtaining a gain value $G_s(m,f)$ of the non-stationary noise suppression, where $$G_s(m, f) = \frac{|X_w(f)|^2}{|X(m, f)|^2}.$$

In the described noise cancellation operation, the calculation amount of the noise cancellation operation process is controlled, thereby reducing the calculation amount of the whole wake-up process of the smart device, and improving the calculation speed and efficiency of the wake-up process of the smart device.

In some exemplary implementations of the embodiment, the wake-up signal obtained after the echo cancellation operation and/or the noise cancellation operation is transformed into a time domain through inverse short-time fourier transform (istft), and then wake-up discrimination is performed using an Automatic Gain Control (AGC) method, so that at least one smart device of which the wake-up discrimination is successful among a plurality of smart devices is determined as at least one candidate device.

In some exemplary implementations of the embodiment, the impacts of noise, late reverberation, and non-stationary noise are taken into account, and methods with small calculation amount are used, so that even on a device with poor performance, a good directional wake-up effect can also be achieved.

In the technical solution provided in operation S204, the target wake-up angle corresponding to the candidate device is used for indicating a direction of a sound source position of the wake-up signal relative to the candidate device. The target wake-up angle may be determined by using, but is not limited to, a Direction-Of-Arrival (DOA) estimation algorithm. The target wake-up energy corresponding to the candidate device is used for indicating energy received by the candidate device from the wake-up signal. The target wake-up energy may be determined by using, but is not limited to, an energy estimation algorithm.

In an exemplary embodiment, the target wake-up angle corresponding to each of the multiple candidate devices may be determined by using, but is not limited to, the following manner: constructing a search function for a wake-up angle variable of each candidate device based on the wake-up signal and the wake-up angle variable of each candidate device; and performing an optimization search on the search function to obtain an optimal solution for the wake-up angle variable of each candidate device as the target wake-up angle corresponding to each candidate device.

In some exemplary implementations of the embodiment, the target wake-up angle corresponding to each candidate device may be determined by using, but not limited to, the method of constructing a search function and performing an optimization search on the search function.

In some exemplary implementations of the embodiment, the search function for the wake-up angle variable may use, but is not limited to, the functional form of a maximum likelihood function.

In an exemplary embodiment, the search function for the wake-up angle variable of each candidate device may be constructed based on the wake-up signal and the wake-up angle variable of each candidate device, by using, but is not limited to, the following manner: constructing a covariance matrix of the wake-up angle variable of each candidate device based on the wake-up signal; constructing a directional derivative for the wake-up angle variable of each candidate device based on the wake-up angle variable of each candidate device; and constructing, based on the covariance matrix and the directional derivative, a maximum likelihood function for the wake-up angle variable of each candidate device as the search function.

In some exemplary implementations of the embodiment, the maximum likelihood function of the wake-up angle variable may be, but is not limited to:

$$Aml(\theta) = \sum_{f=fl}^{fh} Rxx(f) * PA(\theta, f),$$

wherein $PA(\theta,f)$ is the direction derivative of the wake-up angle variable, and $PA(\theta,f)=e^{-j+2\ \pi f^*d/c}$; d is the distance of the sound source with respect to the origin at an angle θ; Rxx(f)=X(f)*X*(f) is the covariance matrix; and X(f) is the microphone array signal.

In some exemplary implementations of the embodiment, the covariance matrix $Rxx(f)=X_c(f)*X_c*(f)$ may be obtained by, but is not limited to, $X_c(m,f)=X(m,f)*G_n(f)*G_r(f)*G_s(m,f)$, where X(m,f) is the frequency domain signal of each microphone array.

In some exemplary implementations of the embodiment, in the process of the echo cancellation operation, each microphone needs to undergo AEC by default, and when the number of microphones is large, the calculation amount also increases. If the calculation amount needs to be simplified, since a linear filter has a target channel and adopts another channel of signal that has already undergone echo cancellation as the reference channel, the AEC may be performed on only these two channels. If the AEC is performed on only two channels, the gain value of the echo cancellation operation $$G_e(m, f) = \frac{|X_{aec}(f)|^2}{|X(m, f)|^2}$$

needs to be calculated, and the final $X_c(m,f)$ may be obtained by multiplying the term $G_e(m,f)$ in the calculation of the covariance matrix.

In an exemplary embodiment, the optimization search is performed on the search function to obtain the optimal solution for the wake-up angle variable of each candidate device as the target wake-up angle corresponding to each candidate device by using, but not limited to, the following manner: initializing search parameters of an optimization search algorithm to obtain target search parameters, wherein the search parameters include: number of particles, particle positions, number of iterations, position range of each particle, maximum speed of each particle, and a learning factor; and executing the optimization search algorithm on the search function by using the target search parameters and linearly decreasing inertia weight, so as to obtain the optimal solution for the wake-up angle variable of each candidate device as the target wake-up angle corresponding to each candidate device.

In some exemplary implementations of the embodiment, the search parameters of the optimization search algorithm may include, but are not limited to, number of particles, particle positions, number of iterations, a position range of each particle, maximum speed of each particle, and a learning factor, and the like.

In some exemplary implementations of the embodiment, the optimization search algorithm may include, but is not limited to, particle swarm optimization algorithm, and the like.

In an exemplary embodiment, the search parameters of the optimization search algorithm may be initialized to obtain the target search parameters by using, but is not limited to, the following manner: initializing the number of particles, the number of iterations, the maximum speed of each particle and the learning factor to obtain a target number of particles, a target number of iterations, a target maximum speed and a target learning factor, wherein the target number of particles, the target number of iterations, the target maximum speed and the target learning factor are used for ensuring that accuracy of the optimization search algorithm reaches an accuracy threshold while minimizing a calculation amount of the optimization search algorithm;

initializing a position range of each particle according to the microphone array arrangement of each candidate device to obtain a target position range; and initializing the particle positions using a historical optimal solution, so as to obtain target particle positions, wherein the target search parameters include the target number of particles, the target number of iterations, the target maximum speed, the target learning factor, the target position range and the target particle positions.

In some exemplary implementations of the embodiment, in order to ensure that the accuracy of the optimization search algorithm reaches an accuracy threshold while minimizing a calculation amount of the optimization search algorithm, the method may include, but is not limited to, selectively adjusting the values of the number of particles, the number of iterations, the maximum speed of each particle, and the learning factor, for example, the target number of particles is 2, the target number of iterations is 10, the target maximum speed does not exceed π/2, and the target learning factor is 2, so that the accuracy of the optimization search algorithm reaches an accuracy threshold while minimizing a calculation amount of the optimization search algorithm.

In some exemplary implementations of the embodiment, a target position range may be determined according to, but is not limited to, the microphone array arrangement of each candidate device; for example, for a linearly arranged microphone array, a position range of each particle may be, but is not limited to, [0, π].

In some exemplary implementations of the embodiment, using a historical optimal solution to initialize particle positions to obtain target particle positions can accelerate the convergence of the optimization search algorithm.

Through the described process, an optimal solution for the equation is quickly determined by means of particle swarm optimization using a maximum likelihood estimation method. On the one hand, array information is fully utilized, and the impacts of reverberation, noise, and non-stationary noise are taken into account when calculating the covariance matrix, significantly enhancing the robustness of the algorithm; on the other hand, by utilizing particle swarm optimization with fewer (e.g., 2) particles and fewer (e.g., 10) iterations, an optimal solution can be stably obtained, avoiding a full-space angle search and significantly reducing the calculation amount.

In an exemplary embodiment, the target wake-up energy corresponding to each of the multiple candidate devices may be determined by using, but is not limited to, the following manner: calculating an energy sum within a frequency range of the wake-up signal corresponding to each candidate device; and determining the energy sum as the target wake-up energy corresponding to each candidate device In some exemplary implementations of the embodiment, the target wake-up energy corresponding to each candidate device may be, but is not limited to, expressed as $P(t)=\Sigma_{f=fl}^{fh}|X_w(f)|^2$, where $X_w(f)$ is the wake-up signal obtained after an echo cancellation operation and/or a noise cancellation operation.

In the technical solution provided in operation S206, according to the target wake-up angle and the target wake-up energy, it is possible to determine, from the multiple candidate devices, a device that is more suitable for a user's expectation as a target device to respond to the wake-up signal of the user.

In an exemplary embodiment, according to the target wake-up angle and the target wake-up energy, the target device may be determined from the multiple candidate devices by using, but is not limited to, the following manner: determining a candidate device of which the target wake-up angle falls in an angle range as the target device; and when none of target wake-up angles corresponding to the multiple candidate devices falls in the angle range, determining a candidate device with maximum target wake-up energy as the target device.

In some exemplary implementations of the embodiment, each smart device corresponds to an angle range allowing for wake-up response, for example, a smart device is allowed to respond when the wake-up signal is directed towards the smart device.

In some exemplary implementations of the embodiment, when there are multiple candidate devices of which the corresponding target wake-up angles fall in the corresponding angle range, a candidate device with maximum corresponding target wake-up energy among the candidate devices may be determined as the target device.

In some exemplary implementations of the embodiment, when none of the target wake-up angles corresponding to the multiple candidate devices falls in the corresponding angle range, the target device is determined according to the target wake-up energy corresponding to each candidate device, for example, a candidate device with maximum corresponding target wake-up energy among the multiple candidate devices is determined as the target device.

In some exemplary implementations of the embodiment, first, it is determined whether the user who issued the wake-up signal is within a preset angle range of a certain device by determining whether the corresponding target wake-up angle falls in the corresponding angle range; if so, the device takes priority in responding; otherwise, the target wake-up energy of each device is compared, and a device with maximum target wake-up energy takes priority in responding.

In some exemplary implementations of the embodiment, for the microphone arrays of the candidate devices, when the sensitivities and gains of the microphone arrays are the same, there is no need for energy calibration; and when the sensitivities, gains, and models of the microphone arrays are inconsistent, energy calibration is required before energy comparison.

In order to better understand the process of the described wake-up method for the smart device, the flow of the method for implementing the described method for waking up a smart device will be described below in combination with an exemplary embodiment, but is not used to limit the technical solutions of the embodiments of the present disclosure.

Figure 3:
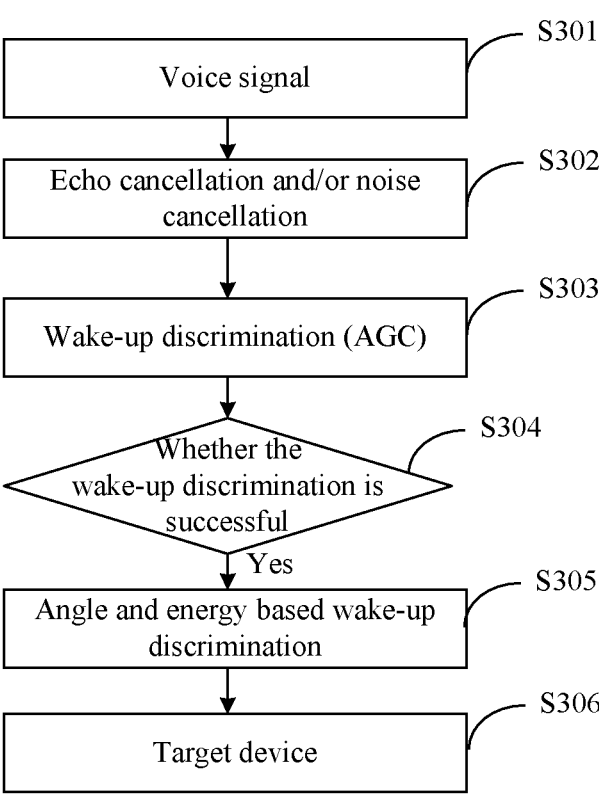
FIG. 3 is a schematic diagram of a wake-up method for a smart device according to an embodiment of the present disclosure.

A wake-up method for a smart device is provided in the present embodiment. FIG. 3 is a schematic diagram of a wake-up method for a smart device according to the embodiment of the present disclosure. As shown in FIG. 3, the method may include, but is not limited to, the following operations S301 to S306.

At operation S301, a voice signal of a user in a target scenario is detected.

At operation S302, an echo cancellation operation and/or a noise cancellation operation are performed on the voice signal to obtain a wake-up signal.

At operation S303, wake-up discrimination (AGC) is performed on the wake-up signal.

At operation S304, whether the wake-up discrimination for each device is successful is determined.

At operation S305, the described wake-up discrimination process according to the angle and energy is performed on a smart device which is allowed to be awakened.

At operation S306, a target device that responds to the voice signal is determined according to a result of the described discrimination process.

Through the description of the described embodiment, a person having ordinary skill in the art may clearly understand that the method according to the described embodiment may be implemented by utilizing software plus a necessary general hardware platform, and definitely may also be implemented by hardware, but in many cases, the former is a preferred implementation. Based on such understanding, the technical solutions of the present disclosure essentially or the part contributing to the prior art may be embodied in the form of a software product. The computer software product is stored in a storage medium (such as a ROM/RAM, a magnetic disk, or an optical disk), and includes several instructions for enabling a terminal device (which may be a mobile phone, a computer, a server, or a network device) to execute the methods of the embodiments of the present disclosure.

Figure 4:
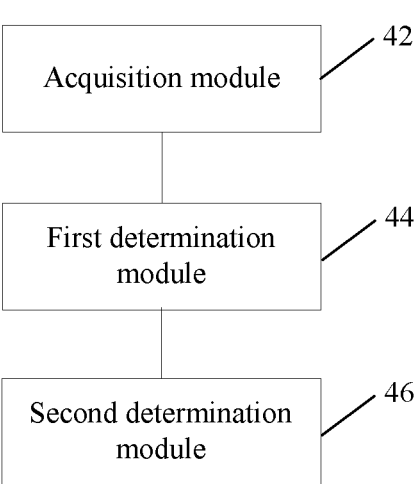
FIG. 4 is a structural block diagram of a wake-up apparatus for a smart device according to an embodiment of the present disclosure.

FIG. 4 is a structural block diagram of a wake-up apparatus for a smart device according to an embodiment of the present disclosure. As shown in FIG. 4, the wake-up apparatus includes:

an acquisition module 42, configured to select, from a plurality of smart devices, at least one smart device that is allowed to be awakened by a wake-up signal as at least one candidate device, wherein the plurality of smart devices are devices that detect the wake-up signal in a target scenario;

a first determination module 44, configured to determine, when there are multiple candidate devices, a target wake-up angle and target wake-up energy corresponding to each of the multiple candidate devices, wherein the target wake-up angle corresponding to the candidate device is used for indicating a direction of a sound source position of the wake-up signal relative to the candidate device, and the target wake-up energy corresponding to the candidate device is used for indicating energy received by the candidate device from the wake-up signal; and a second determination module 46, configured to determine a target device from the multiple candidate devices according to the target wake-up angle and the target wake-up energy, wherein the target device is used for responding to the wake-up signal.

By means of the described embodiment, when there are a plurality of smart devices that detect a wake-up signal in a target scenario, at least one smart device that is allowed to be awakened by the wake-up signal is determined from the plurality of smart devices as at least one candidate device; and when there are multiple candidate devices, a target wake-up angle and target wake-up energy corresponding to each candidate device are determined, then a target device that responds to the wake-up signal is determined according to the target wake-up angle and the target wake-up energy, and a candidate device with maximum target wake-up energy is determined as the target device. By means of the described technical solutions, the problems in the related art such as low accuracy in determining a smart device that responds to a wake-up instruction are solved, achieving the technical effect of enhancing the accuracy in determining a smart device that responds to a wake-up instruction.

In an exemplary embodiment, the second determination module includes: a first determination unit, configured to determine a candidate device of which the target wake-up angle falls in an angle range as the target device; and a second determination unit, configured to determine a candidate device with maximum target wake-up energy as the target device when none of target wake-up angles corresponding to the multiple candidate devices falls in the angle range.

In an exemplary embodiment, the first determination module includes: a construction unit, configured to construct a search function for a wake-up angle variable of each of the multiple candidate devices based on the wake-up signal and the wake-up angle variable of each of the multiple candidate devices; and a searching unit, configured to perform an optimization search on the search function to obtain an optimal solution of the wake-up angle variable of each of the multiple candidate devices as the target wake-up angle corresponding to each of the multiple candidate devices.

In an exemplary embodiment, the construction unit is further configured to: construct a covariance matrix of the wake-up angle variable of each of the multiple candidate devices based on the wake-up signal; construct a directional derivative for the wake-up angle variable of each of the multiple candidate devices based on the wake-up angle variable of each of the multiple candidate devices; and construct, based on the covariance matrix and the directional derivative, a maximum likelihood function for the wake-up angle variable of each of the multiple candidate devices as the search function.

In an exemplary embodiment, the search unit is further configured to: initialize search parameters of an optimization search algorithm to obtain target search parameters, wherein the search parameters include: number of particles, particle positions, number of iterations, position range of each particle, maximum speed of each particle, and a learning factor; and execute the optimization search algorithm on the search function by using the target search parameters and linearly decreasing inertia weight, so as to obtain the optimal solution for the wake-up angle variable of each of the multiple candidate devices as the target wake-up angle corresponding to each of the multiple candidate devices.

In an exemplary embodiment, the search unit is further configured to: initialize the number of particles, the number of iterations, the maximum speed of each particle and the learning factor to obtain a target number of particles, a target number of iterations, a target maximum speed and a target learning factor, wherein the target number of particles, the target number of iterations, the target maximum speed and the target learning factor are used for ensuring that accuracy of the optimization search algorithm reaches an accuracy threshold while minimizing a calculation amount of the optimization search algorithm; and initialize the position range of each particle according to microphone array arrangement of each of the multiple candidate devices to obtain a target position range; and initialize the particle positions using a historical optimal solution to obtain target particle positions, wherein the target search parameter includes the target number of particles, the target number of iterations, the target maximum speed, the target learning factor, the target position range and the target particle positions.

In an exemplary embodiment, the first determination module includes: a calculation unit, configured to calculate an energy sum within a frequency range of the wake-up signal and corresponding to each of the multiple candidate devices; and a third determination unit, configured to determine the energy sum as the target wake-up energy corresponding to each of the multiple candidate devices.

In an exemplary embodiment, the acquisition module includes: an execution unit, configured to execute an echo cancellation operation and/or a noise cancellation operation on a voice signal received by each smart device, so as to obtain the wake-up signal, wherein the noise cancellation operation includes at least one of: stationary noise suppression, reverberation suppression, and non-stationary noise suppression; a discrimination unit, configured to perform wake-up discrimination on each smart device based on the wake-up signal; and a fourth determination unit, configured to determine, from the plurality of smart devices, at least one smart device of which the wake-up discrimination is successful as the at least one candidate device.

The embodiments of the present disclosure further provide a storage medium, wherein the storage medium includes a stored program, and the program, when running on a processor, causes the processor to execute the method according to any one of the described embodiments.

In some exemplary implementations of the embodiment, the storage medium may be configured to store program codes for executing the following operations:

S1, selecting, from a plurality of smart devices, at least one smart device that is allowed to be awakened by a wake-up signal as at least one candidate device, wherein the plurality of smart devices are devices that detect the wake-up signal in a target scenario;

S2, when there are multiple candidate devices, determining a target wake-up angle and target wake-up energy corresponding to each of the multiple candidate devices, wherein the target wake-up angle corresponding to the candidate device is used for indicating a direction of a sound source position of the wake-up signal relative to the candidate device, and the target wake-up energy corresponding to the candidate device is used for indicating energy received by the candidate device from the wake-up signal; and S3, determining a target device from the multiple candidate devices according to the target wake-up angle and the target wake-up energy, wherein the target device is used for responding to the wake-up signal.

The embodiments of the present disclosure further provide an electronic device, including a memory and a processor, wherein the memory stores a computer program, and the processor is configured to run the computer program to execute operations in any one of the method embodiments.

In some exemplary embodiments, the electronic device may further include a transmission device and an input/output device, wherein the transmission device is connected to the processor, and the input/output device is connected to the processor.

In some exemplary implementations of the embodiment, the processor may be configured to execute the following operations by means of a computer program:

S1, selecting, from a plurality of smart devices, at least one smart device that is allowed to be awakened by a wake-up signal as at least one candidate device, wherein the plurality of smart devices are devices that detect the wake-up signal in a target scenario;

S2, when there are multiple candidate devices, determining a target wake-up angle and target wake-up energy corresponding to each of the multiple candidate devices, wherein the target wake-up angle corresponding to the candidate device is used for indicating a direction of a sound source position of the wake-up signal relative to the candidate device, and the target wake-up energy corresponding to the candidate device is used for indicating energy received by the candidate device from the wake-up signal; and S3, determining a target device from the multiple candidate devices according to the target wake-up angle and the target wake-up energy, wherein the target device is used for responding to the wake-up signal.

In some exemplary implementations of the embodiment, the storage medium may include, but is not limited to, any medium that can store program codes, such as a USB drive, a Read-Only Memory (ROM), a Random Access Memory (RAM), an external hard drive, a disk, or an optical disc.

In some exemplary embodiments, for specific examples in this embodiment, reference may be made to the examples described in the described embodiments and exemplary implementations, and details are not repeatedly described herein in this embodiment.

Obviously, a person having ordinary skill in the art should understand that the modules or the operations of the present disclosure may be implemented by a general computing device, and the modules or operations may be centralized on a single computing device or distributed on a network formed by a plurality of computing devices. In some exemplary embodiments, the modules or operations may be implemented by program codes executable by a computing device, so that the modules or operations may be stored in a storage device for execution with a computing device; and in some cases, the shown or described modules or operations may be executed in sequences different from those described here, or the modules or operations may be made into integrated circuit modules respectively, or multiple modules or operations therein may be made into a single integrated circuit module for implementation. As such, the present disclosure is not limited to any specific combination of hardware and software.

The foregoing descriptions are merely exemplary embodiments of the present disclosure, but are not intended to limit the present disclosure. For a person having ordinary skill in the art, the present disclosure may have various modifications and variations. Any modifications, equivalent replacements, improvements and the like made within the principle of the present disclosure shall belong to the scope of protection of the present disclosure.

What is claimed is:

1. A wake-up method for a smart device, comprising:
   selecting, from a plurality of smart devices, at least one smart device that is allowed to be awakened by a wake-up signal as at least one candidate device among multiple candidate devices, wherein the plurality of smart devices are devices that detect the wake-up signal in a target scenario;
   determining a target wake-up angle and target wake-up energy corresponding to each of the multiple candidate devices, wherein the target wake-up angle corresponding to the candidate device is used for indicating a direction of a sound source position of the wake-up signal relative to the candidate device, the target wake-up energy corresponding to the candidate device is used for indicating energy received by the candidate device from the wake-up signal, and determining the target wake-up angle corresponding to each of the multiple candidate devices comprises: constructing a search function for a wake-up angle variable of each of the multiple candidate devices based on the wake-up signal and the wake-up angle variable of each of the multiple candidate devices; and performing an optimization search on the search function to obtain an optimal solution for the wake-up angle variable of each of the multiple candidate devices as the target wake-up angle corresponding to each of the multiple candidate devices, wherein constructing the search function for the wake-up angle variable of each of the multiple candidate devices based on the wake-up signal and the wake-up angle variable of each of the multiple candidate devices comprises: constructing a covariance matrix of the wake-up angle variable of each of the multiple candidate devices based on the wake-up signal; constructing a directional derivative for the wake-up angle variable of each of the multiple candidate devices based on the wake-up angle variable of each of the multiple candidate devices; and constructing, based on the covariance matrix and the directional derivative, a maximum likelihood function for the wake-up angle variable of each of the multiple candidate devices as the search function, wherein the maximum likelihood function for the wake-up angle variable is $Aml(\theta)$ $=\Sigma_{f=fl}^{fh}Rxx(f)*PA(\theta,f)$, wherein $PA(\theta,f)$ is the direction derivative of the wake-up angle variable; $Rxx(f)$ is the covariance matrix; and
   determining a target device from the multiple candidate devices according to the target wake-up angle and the target wake-up energy, wherein the target device is used for responding to the wake-up signal.

2. The wake-up method for the smart device according to claim 1, wherein determining the target device from the multiple candidate devices according to the target wake-up angle and the target wake-up energy comprises:
   determining a candidate device of which the target wake-up angle falls in an angle range as the target device; and
   when none of target wake-up angles corresponding to the multiple candidate devices falls in the angle range, determining a candidate device with maximum target wake-up energy as the target device.

3. The wake-up method for the smart device according to claim 1, wherein performing the optimization search on the search function to obtain the optimal solution for the wake-up angle variable of each of the multiple candidate devices as the target wake-up angle corresponding to each of the multiple candidate devices comprises:
   initializing search parameters of an optimization search algorithm to obtain target search parameters, wherein the search parameters comprise: number of particles, particle positions, number of iterations, position range of each particle, maximum speed of each particle, and a learning factor; and
   executing the optimization search algorithm on the search function by using the target search parameters and linearly decreasing inertia weight, so as to obtain the optimal solution for the wake-up angle variable of each of the multiple candidate devices as the target wake-up angle corresponding to each of the multiple candidate devices.

4. The wake-up method for the smart device according to claim 3, wherein initializing the search parameters of the optimization search algorithm to obtain the target search parameters comprises:
   initializing the number of particles, the number of iterations, the maximum speed of each particle and the learning factor to obtain a target number of particles, a target number of iterations, a target maximum speed and a target learning factor, wherein the target number of particles, the target number of iterations, the target maximum speed and the target learning factor are used for ensuring that accuracy of the optimization search algorithm reaches an accuracy threshold while minimizing a calculation amount of the optimization search algorithm;

initializing a position range of each particle according to microphone array arrangement of each of the multiple candidate devices to obtain a target position range; and initializing the particle positions using a historical optimal solution, so as to obtain target particle positions, wherein the target search parameters comprise the target number of particles, the target number of iterations, the target maximum speed, the target learning factor, the target position range and the target particle positions.

5. The wake-up method for the smart device according to claim 1, wherein determining the target wake-up energy corresponding to each of the multiple candidate devices comprises:

calculating an energy sum within a frequency range of the wake-up signal and corresponding to each of the multiple candidate devices; and determining the energy sum as the target wake-up energy corresponding to each of the multiple candidate devices.

6. The wake-up method for the smart device according to claim 5, wherein the target wake-up energy corresponding to each candidate device is expressed as $P(t)=\Sigma_{f=fl}^{fh}|X_w(f)|^2$, where $X_w(f)$ is the wake-up signal obtained after an echo cancellation operation and/or a noise cancellation operation.

7. The wake-up method for the smart device according to claim 1, wherein selecting, from the plurality of smart devices, at least one smart device that is allowed to be awakened by the wake-up signal as at least one candidate device comprises:

executing an echo cancellation operation and/or a noise cancellation operation on a voice signal received by each smart device, so as to obtain the wake-up signal, wherein the noise cancellation operation comprises at least one of: stationary noise suppression, reverberation suppression, and non-stationary noise suppression;

performing wake-up discrimination on each smart device based on the wake-up signal; and determining, from the plurality of smart devices, at least one smart device of which the wake-up discrimination is successful as the at least one candidate device.

8. The wake-up method for the smart device according to claim 1, wherein the wake-up signal is wake-up information which is extracted from a voice signal issued by a user.

9. A wake-up apparatus for a smart device, comprising a memory and a processor, wherein the memory stores a computer program, and the processor is configured to run the computer program to:

select, from a plurality of smart devices, at least one smart device that is allowed to be awakened by a wake-up signal as at least one candidate device among multiple candidate devices, wherein the plurality of smart devices are devices that detect the wake-up signal in a target scenario;

determine a target wake-up angle and target wake-up energy corresponding to each of the multiple candidate devices, wherein the target wake-up angle corresponding to the candidate device is used for indicating a direction of a sound source position of the wake-up signal relative to the candidate device, the target wake-up energy corresponding to the candidate device is used for indicating energy received by the candidate device from the wake-up signal, and the processor, when configured to determine the target wake-up angle corresponding to each of the multiple candidate devices, is configured to: construct a search function for a wake-up angle variable of each of the multiple candidate devices based on the wake-up signal and the wake-up angle variable of each of the multiple candidate devices; and perform an optimization search on the search function to obtain an optimal solution of the wake-up angle variable of each of the multiple candidate devices as the target wake-up angle corresponding to each of the multiple candidate devices, wherein the processor, when configured to construct a search function for a wake-up angle variable of each of the multiple candidate devices based on the wake-up signal and the wake-up angle variable of each of the multiple candidate devices, is configured to: construct a covariance matrix of the wake-up angle variable of each of the multiple candidate devices based on the wake-up signal; construct a directional derivative for the wake-up angle variable of each of the multiple candidate devices based on the wake-up angle variable of each of the multiple candidate devices; and construct, based on the covariance matrix and the directional derivative, a maximum likelihood function for the wake-up angle variable of each of the multiple candidate devices as the search function, wherein the maximum likelihood function for the wake-up angle variable is $Aml(\theta)=\Sigma_{f=fl}^{fh}Rxx(f)*PA(\theta,f)$, wherein $PA(\theta,f)$ is the direction derivative of the wake-up angle variable; $Rxx(f)$ is the covariance matrix; and determine a target device from the multiple candidate devices according to the target wake-up angle and the target wake-up energy, wherein the target device is used for responding to the wake-up signal.

10. The wake-up apparatus for the smart device according to claim 9, wherein the processor, when configured to determine a target device from the multiple candidate devices according to the target wake-up angle and the target wake-up energy, is configured to:

determine a candidate device of which the target wake-up angle falls in an angle range as the target device; and determine a candidate device with maximum target wake-up energy as the target device when none of target wake-up angles corresponding to the multiple candidate devices falls in the angle range.

11. The wake-up apparatus for the smart device according to claim 9, wherein the processor, when configured to perform an optimization search on the search function to obtain an optimal solution of the wake-up angle variable of each of the multiple candidate devices as the target wake-up angle corresponding to each of the multiple candidate devices, is configured to:

initialize search parameters of an optimization search algorithm to obtain target search parameters, wherein the search parameters comprise: number of particles, particle positions, number of iterations, position range of each particle, maximum speed of each particle, and a learning factor; and execute the optimization search algorithm on the search function by using the target search parameters and linearly decreasing inertia weight, so as to obtain the optimal solution for the wake-up angle variable of each of the multiple candidate devices as the target wake-up angle corresponding to each of the multiple candidate devices.

12. The wake-up apparatus for the smart device according to claim 11, wherein the processor, when configured to initialize search parameters of an optimization search algorithm to obtain target search parameters, is configured to:

initialize the number of particles, the number of iterations, the maximum speed of each particle and the learning factor to obtain a target number of particles, a target number of iterations, a target maximum speed and a target learning factor, wherein the target number of particles, the target number of iterations, the target maximum speed and the target learning factor are used for ensuring that accuracy of the optimization search algorithm reaches an accuracy threshold while minimizing a calculation amount of the optimization search algorithm; and initialize the position range of each particle according to microphone array arrangement of each of the multiple candidate devices to obtain a target position range; and initialize the particle positions using a historical optimal solution to obtain target particle positions, wherein the target search parameter comprises the target number of particles, the target number of iterations, the target maximum speed, the target learning factor, the target position range and the target particle positions.

13. The wake-up apparatus for the smart device according to claim 9, wherein the processor, when configured to determine target wake-up energy corresponding to each of the multiple candidate devices, is configured to:

calculate an energy sum within a frequency range of the wake-up signal and corresponding to each of the multiple candidate devices; and determine the energy sum as the target wake-up energy corresponding to each of the multiple candidate devices.

14. The wake-up apparatus for the smart device according to claim 9, wherein the processor, when configured to select, from a plurality of smart devices, at least one smart device that is allowed to be awakened by a wake-up signal as at least one candidate device, is configured to:

execute an echo cancellation operation and/or a noise cancellation operation on a voice signal received by each smart device, so as to obtain the wake-up signal, wherein the noise cancellation operation comprises at least one of: stationary noise suppression, reverberation suppression, and non-stationary noise suppression;

perform wake-up discrimination on each smart device based on the wake-up signal; and determine, from the plurality of smart devices, at least one smart device of which the wake-up discrimination is successful as the at least one candidate device.

15. A non-transitory computer-readable storage medium, wherein the computer-readable storage medium stores a program, and the program, when running on a processor, causes the processor to execute following operations:

selecting, from a plurality of smart devices, at least one smart device that is allowed to be awakened by a wake-up signal as at least one candidate device among multiple candidate devices, wherein the plurality of smart devices are devices that detect the wake-up signal in a target scenario;

determining a target wake-up angle and target wake-up energy corresponding to each of the multiple candidate devices, wherein the target wake-up angle corresponding to the candidate device is used for indicating a direction of a sound source position of the wake-up signal relative to the candidate device, the target wake-up energy corresponding to the candidate device is used for indicating energy received by the candidate device from the wake-up signal, and determining the target wake-up angle corresponding to each of the multiple candidate devices comprises: constructing a search function for a wake-up angle variable of each of the multiple candidate devices based on the wake-up signal and the wake-up angle variable of each of the multiple candidate devices; and performing an optimization search on the search function to obtain an optimal solution for the wake-up angle variable of each of the multiple candidate devices as the target wake-up angle corresponding to each of the multiple candidate devices, wherein constructing the search function for the wake-up angle variable of each of the multiple candidate devices based on the wake-up signal and the wake-up angle variable of each of the multiple candidate devices comprises: constructing a covariance matrix of the wake-up angle variable of each of the multiple candidate devices based on the wake-up signal; constructing a directional derivative for the wake-up angle variable of each of the multiple candidate devices based on the wake-up angle variable of each of the multiple candidate devices; and constructing, based on the covariance matrix and the directional derivative, a maximum likelihood function for the wake-up angle variable of each of the multiple candidate devices as the search function, wherein the maximum likelihood function for the wake-up angle variable is $Aml(\theta)=\Sigma_{f=fl}^{fh}Rxx(f)*PA(\theta,f)$, wherein $PA(\theta,f)$ is the direction derivative of the wake-up angle variable; $Rxx(f)$ is the covariance matrix; and determining a target device from the multiple candidate devices according to the target wake-up angle and the target wake-up energy, wherein the target device is used for responding to the wake-up signal.

\* \* \* \* \*